US012681976B2

(12) United States Patent　　　　　(10) Patent No.: US 12,681,976 B2

Hong　　　　　　　　　　　　　　　　(45) Date of Patent: Jul. 14, 2026

(54) SYSTEM AND METHOD FOR DOCUMENT METADATA ANALYSIS AND GENERATION

(71) Applicant: En Hong, Tai Hang (HK)

(72) Inventor: En Hong, Tai Hang (HK)

( * ) Notice: Subject to any disclaimer, the term of this patent is extended or adjusted under 35 U.S.C. 154(b) by 0 days.

(21) Appl. No.: 18/635,152

(22) Filed: Apr. 15, 2024

(65) Prior Publication Data

US 2024/0346061 A1　　Oct. 17, 2024

Related U.S. Application Data

(60) Provisional application No. 63/459,606, filed on Apr. 15, 2023.

(51) Int. Cl.
　　*G06F 16/383*　　(2019.01)
　　*G06F 16/3331*　　(2025.01)

(52) U.S. Cl.
　　CPC ........ *G06F 16/383* (2019.01); *G06F 16/3331* (2019.01)

(58) Field of Classification Search
　　CPC ..... G06F 16/383; G06F 16/38; G06F 16/3331
　　See application file for complete search history.

(56) References Cited

U.S. PATENT DOCUMENTS

| | | | |
|---|---|---|---|
| 7,849,081 | B1 | 12/2010 | Chang et al. |
| 9,298,696 | B2 * | 3/2016 | Marian .................. G06Q 10/00 |
| 9,460,078 | B2 | 10/2016 | Dwarakanath et al. |
| 10,108,697 | B1 * | 10/2018 | Poteet .................... G06F 16/38 |
| 10,650,086 | B1 * | 5/2020 | Knudson ............... G06F 40/134 |
| 10,769,503 | B1 * | 9/2020 | Buhler .................... G06F 16/56 |
| 11,934,801 | B2 * | 3/2024 | Rahmani .................. G06F 8/33 |

(Continued)

FOREIGN PATENT DOCUMENTS

| | | |
|---|---|---|
| CN | 113343661 A | 9/2021 |
| CN | 114222971 A | 3/2022 |

OTHER PUBLICATIONS

Veyseh et al., A Joint Model for Definition Extraction with Syntactic Connection and Semantic Consistency. The thirty-Fourth AAAI Conference on Artificial Intelligence (AAAI-20), Department of Computer and Information Science, University of Oregon, 8 pp.

(Continued)

*Primary Examiner* — Vaishali Shah

(74) *Attorney, Agent, or Firm* — Young Basile Hanlon & MacFarlane, P.C.

(57)　　　　　　　ABSTRACT

Provided is a system and a computer implemented method for generating metadata for a document and documents therefrom. A document is received for analysis via a communication interface a document for analysis. Text is extracted from the document and using a structural analyser model a plurality of segment titles therein are identified and regular expressions derived therefrom. A segmented document is generated comprising extracted text in logical segments with corresponding segment titles by analysing the generated regular expressions. For at least some of the plurality of the logical segments of the segmented document structured metadata summaries of that segment are generated using a metadata creator model. Document metadata thereof is also generated using a metadata creator model. When a new document is requested, using a library of documents and corresponding metadata that document may be generated.

20 Claims, 9 Drawing Sheets

(56)                    References Cited

U.S. PATENT DOCUMENTS

| | | | | |
|---|---|---|---|---|
| 12,008,309 | B1 * | 6/2024 | Krishnan | G06F 3/0482 |
| 2010/0074524 | A1 * | 3/2010 | Stollman | G06F 40/30 |
| | | | | 382/175 |
| 2010/0284623 | A1 * | 11/2010 | Chen | G06V 30/414 |
| | | | | 382/224 |
| 2012/0271844 | A1 * | 10/2012 | Selbie | G06F 16/38 |
| | | | | 707/E17.069 |
| 2015/0309986 | A1 * | 10/2015 | Brav | G06F 40/284 |
| | | | | 707/739 |
| 2018/0293907 | A1 * | 10/2018 | Meltzer | G06F 16/382 |
| 2021/0256094 | A1 * | 8/2021 | Benara | G06F 16/353 |
| 2023/0060252 | A1 * | 3/2023 | Bly | G06N 7/01 |
| 2023/0252224 | A1 * | 8/2023 | Tran | G06F 40/56 |
| | | | | 715/256 |

OTHER PUBLICATIONS

Litera, Contract Companion—Legal Proofreading, Microsoft AppSource, 3 pp.
HotDocs Templates Overview, 4 pp.
Tran et al., The Recent Advances in Automatic Term Extraction: A survey. ACM Computing Surveys Journal, Dec. 12-24, 2022, New York, NY, USA, 25 pp.
PCT International Search Report from related PCT application No. PCT/IB2024/0453580, dated Apr. 22, 2025, 3 pages.

* cited by examiner

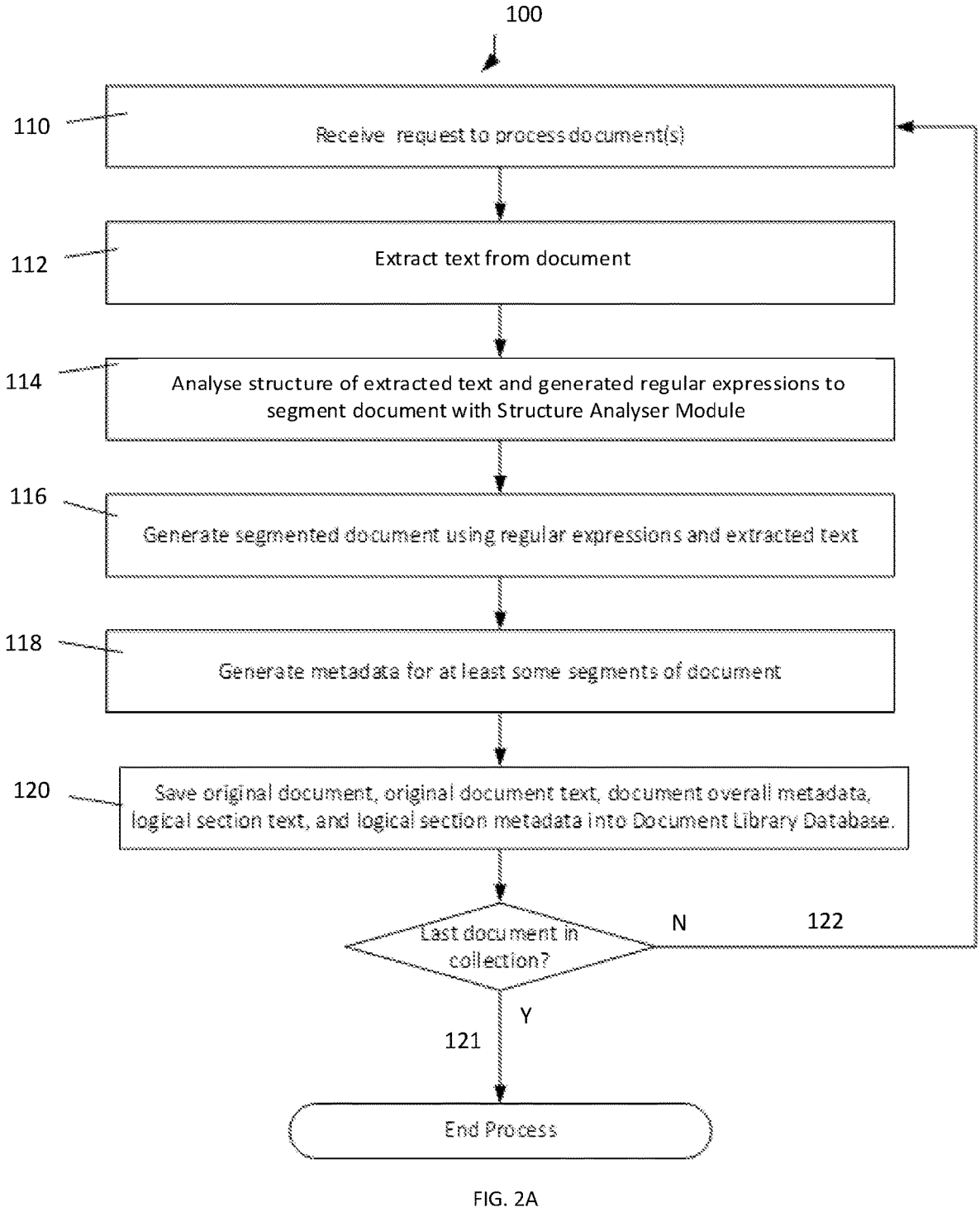

100

110 — Receive request to process document(s)

112 — Extract text from document

114 — Analyse structure of extracted text and generated regular expressions to segment document with Structure Analyser Module 116 — Generate segmented document using regular expressions and extracted text 118 — Generate metadata for at least some segments of document 120 — Save original document, original document text, document overall metadata, logical section text, and logical section metadata into Document Library Database.

Last document in collection?          N          122

121          Y

End Process

FIG. 2A

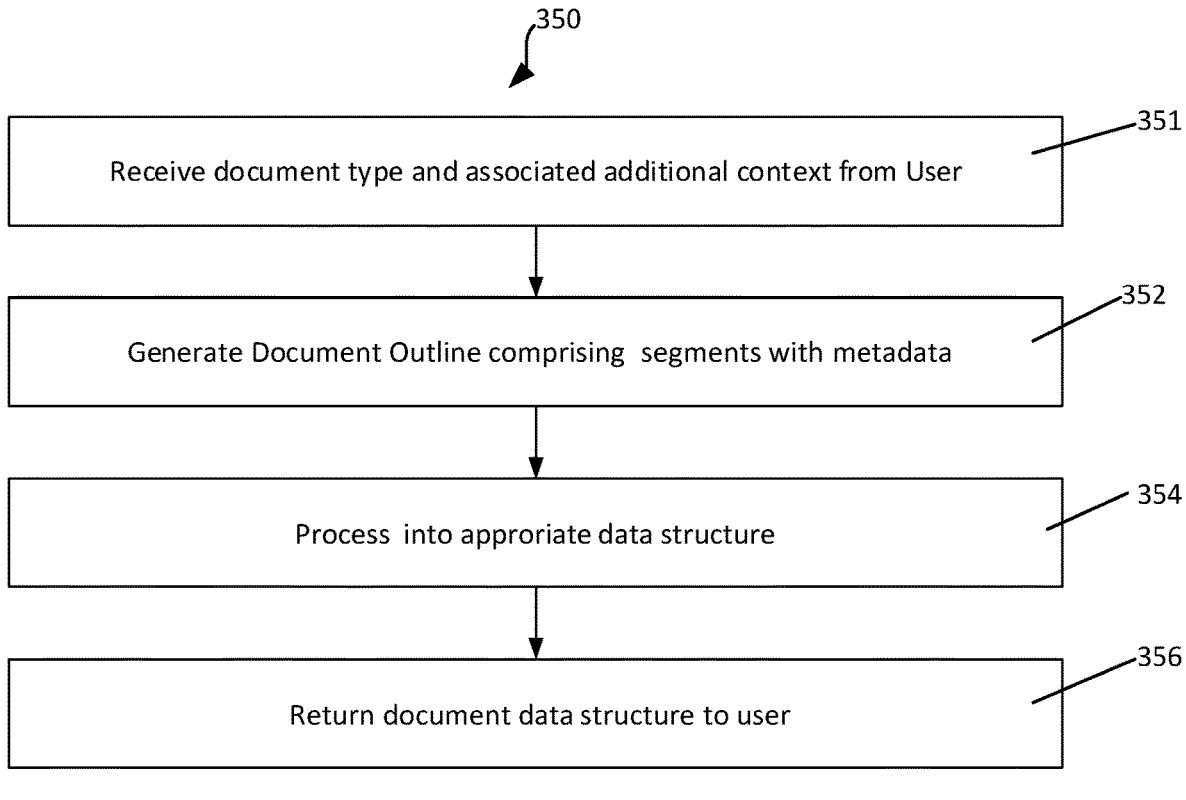

350

351

Receive document type and associated additional context from User

352

Generate Document Outline comprising segments with metadata

354

Process into approriate data structure

356

Return document data structure to user

FIG. 3B

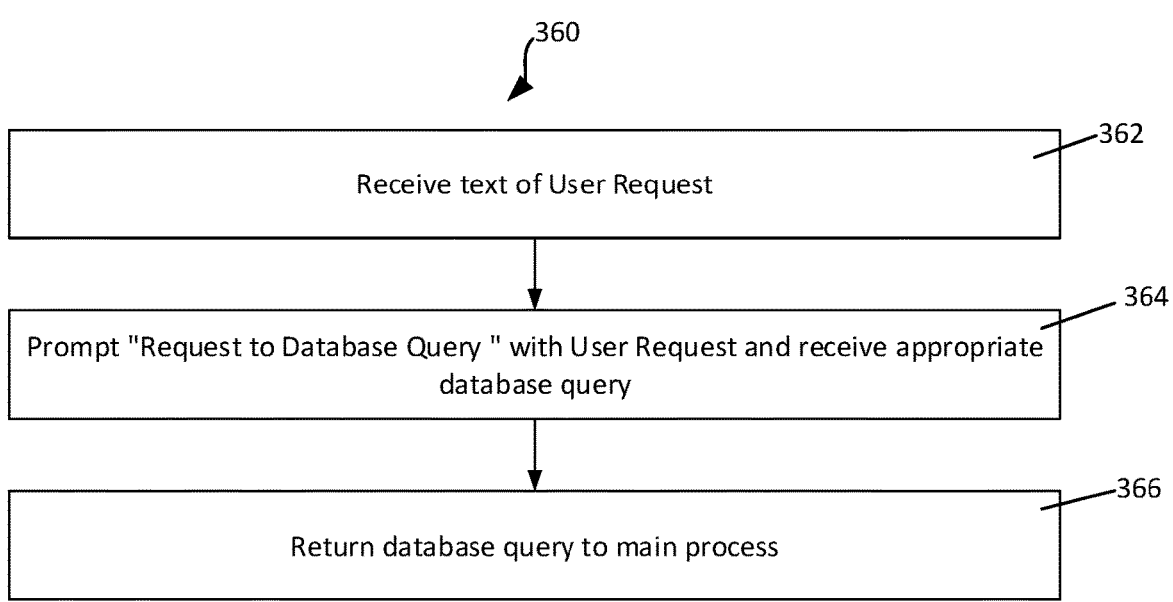

360

362

Receive text of User Request

364

Prompt "Request to Database Query " with User Request and receive appropriate database query

366

Return database query to main process

Receive segment title and metadata along with document type and associated relevant results

374

Generate associated prompts

376

Send associated prompts to Segment Creator

378

Return segment text

SYSTEM AND METHOD FOR DOCUMENT METADATA ANALYSIS AND GENERATION

CROSS-REFERENCE TO RELATED APPLICATION(S)

This application claims priority to U.S. Ser. No. 63/459,606, entitled System and Method for the use of Large Language Models to Create Metadata Rich Document Libraries and Novel Documents, filed Apr. 15, 2023, which is incorporated herein by reference.

FIELD OF THE DISCLOSURE

The present disclosure relates to a system and method for analysing documents of varying types and structures by generating and associating metadata of such documents, including determining logical, context appropriate, divisions in individual documents. Documents analysed according to the present disclosure can be stored in a library and used for generation of new documents based on analysed metadata and examples therein.

BACKGROUND

Document analysis and management, particularly in specialized fields such as finance or law, has traditionally relied on time-consuming manual human analysis performed by costly subject matter experts. As a result, the process of reviewing, understanding, and managing collections of complex documents, such as legal contracts, can be labour-intensive and slow, often resulting in inefficiencies and increased expenses.

The present invention improves upon prior methods in several key ways. Traditional Natural Language Processing ("NLP") approaches struggled with context awareness in documents. For example, prior NLP methods often relied on approaches such as bag-of-words models or rule-based techniques which treated words or phrases in isolation. These methods didn't consider the surrounding larger context, making it difficult to accurately capture the intended meaning of large amounts of text. Additionally, because much language is inherently ambiguous, prior methods struggled to disambiguate phrases and words. Earlier methods also heavily relied on manually specified rules or patterns to extract metadata, which often required substantial effort and expertise. These rule-based systems struggled to handle variations in text formats, language usage, or complex document structures, leading to limited accuracy and scalability.

Many prior methods also lacked the ability to generalize across different document types or domains. They often relied on specific heuristics or hard-coded rules, which may not apply effectively to diverse documents. This limited accuracy and adaptability of prior methods when categorizing metadata for documents with varying structures, terminologies, or styles.

Traditional methods also faced difficulties in handling unstructured data, such as free-form text or documents with inconsistent formatting. These techniques were primarily designed for structured data, making it challenging to accurately categorize and extract metadata from unstructured documents.

Finally, prior methods often struggled to leverage additional data for learning and accuracy improvement. They were limited in their ability to acquire knowledge from external corpora and could not adapt beyond their designed-for purpose.

It is an object of the present disclosure to provide an alternative which addresses or at least ameliorates at least some of the problems and disadvantages of these approaches.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a computer implemented method for generating metadata for a document; comprising the steps of:

receiving via a communication interface a document for analysis;

extracting from the document the text thereof and identifying using a structural analyser model a plurality of segment titles therein for derivation of regular expressions therefrom;

generating a segmented document comprising extracted text in logical segments with corresponding segment titles by analysing the generated regular expressions;

generating for at least some of the plurality of the logical segments of the segmented document structured metadata summaries of that segment using a metadata creator model;

generating document metadata thereof using a metadata creator model.

Advantageously, the method may further comprise storing the document, corresponding document metadata and structured metadata for each segment analysed in one or more libraries.

The document metadata and structured metadata for each segment analysed may be stored in a first data library having a link to the document from which they are derived wherein said document is stored in a separate document library.

The method may further comprise:

(a) generating one or more document libraries comprising a plurality of documents with metadata, said metadata generated by the method described herein;

(b) generating for said requested one or more segments, a document outline data structure via a document outlining module; said document outline specifying a plurality of segments therein; and (c) for each segment of the generated document outline data structure generating text derived from the segment metadata.

(d) generating each of the segments of a requested document and merging and refining the generated segments thereof using a collation module Segment text may be generated by:

transforming the segment and metadata thereof into a text request resembling a user request;

generating via a database query module a database query request from the generated text request for querying the document library;

retrieving from the library segment metadata information using said database query request;

generating via a segment creator module corresponding segment text using said retrieved information and text and either creating a data structure with said segment text or appending said segment text to a pre-existing data structure.

Preferably said collation step comprises:

extracting defined terms and definitions for all segments into a common raw defined terms data structure;

transforming the raw defined terms data structure into a prompt;

generating a further data structure using said prompt containing a plurality of consistent defined terms therein and associated enhanced definitions thereof;

replacing each occurrence of the raw defined term with an updated defined term if appropriate in each segment prior to merger together thereof.

Optionally, the method may further comprise generating a global list of defined terms in the document from the consistent defined terms data structure as the first segment in the generated document.

In a further aspect there is provide a system including a communication interface and a processor, the system configured for generating a document by performing a method comprising:

(a) generating a document library comprising a plurality of documents comprising a plurality of segments and corresponding metadata for said document and segments; wherein said metadata is generated as set out herein;

(b) receiving a new document request via a communication interface;

(c) generating a document outline data structure via a document outlining module according to said request; said document outline specifying a plurality of segments therein; and (d) for each segment of the document outline data structure generated responsive to said request, generating document segments via a segment creator module; and (e) generating a document by merging and refining said generated segments via a collation module.

Each segment may be generated by (a) transforming that segment and metadata thereof into a text request resembling a user request;

(b) generating via a database query module a database query request from the generated text request for querying the document library;

(c) retrieving from the document library segment metadata information using said database query request;

(d) generating document segments via a segment creator module using said retrieved segment metadata information and text and creating a data structure or appending said generated document segments to a pre-existing data structure;

Said collation module may be configured to:

(a) extract defined terms and definitions for all segments into a common raw defined terms data structure;

(b) transform the raw defined terms data structure into a prompt;

(c) generate a further data structure using said prompt containing a plurality of consistent defined terms therein and associated enhanced definitions thereof;

(d) replace each occurrence of the raw defined term with an updated defined term if appropriate in each segment prior to merger together of each segment.

Preferably the modules are each independent large language models.

In a further aspect, there is provided one or more non-transitory computer readable media (e.g., a non-transitory machine-readable medium) having instructions stored thereon for performing a method described herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended Figures. Understanding that these Figures depict only exemplary embodiments of the disclosure and are not therefore to be considered to be limiting of its scope, the principles herein are described and explained with additional specificity and detail through the use of the accompanying Figures.

Preferred embodiments of the present disclosure will be explained in further detail below by way of examples and with reference to the accompanying Figures, in which:

FIG. 2A depicts a high-level flowchart showing the steps of dividing a document based on logical segments, creation of the metadata for such segments within a document, and creation of the metadata for the overall document in an embodiment of the present disclosure.

FIG. 3B depicts a flowchart outlining the steps performed by an embodiment of the Document Outliner model referred to in FIG. 3A.

FIG. 3C depicts a flowchart outlining in more detail the steps in the operation of the Database Query module referred to in FIG. 3A.

DETAILED DESCRIPTION

Various embodiments of the disclosure are discussed in detail below.

While specific implementations are discussed, it should be understood that this is done for illustration purposes only.

A person skilled in the relevant art will recognize that other components and configurations may be used without departing from the spirit and scope of the disclosure.

The disclosed technology addresses the need in the art for a convenient and reliable document analysis method and system which can be used to populate a document library. Access to the document library by a documentation generation system can enable generation documents responsive to the prompt supplied by a user and the previous documents which have been analysed in the document library.

Figure 1A:
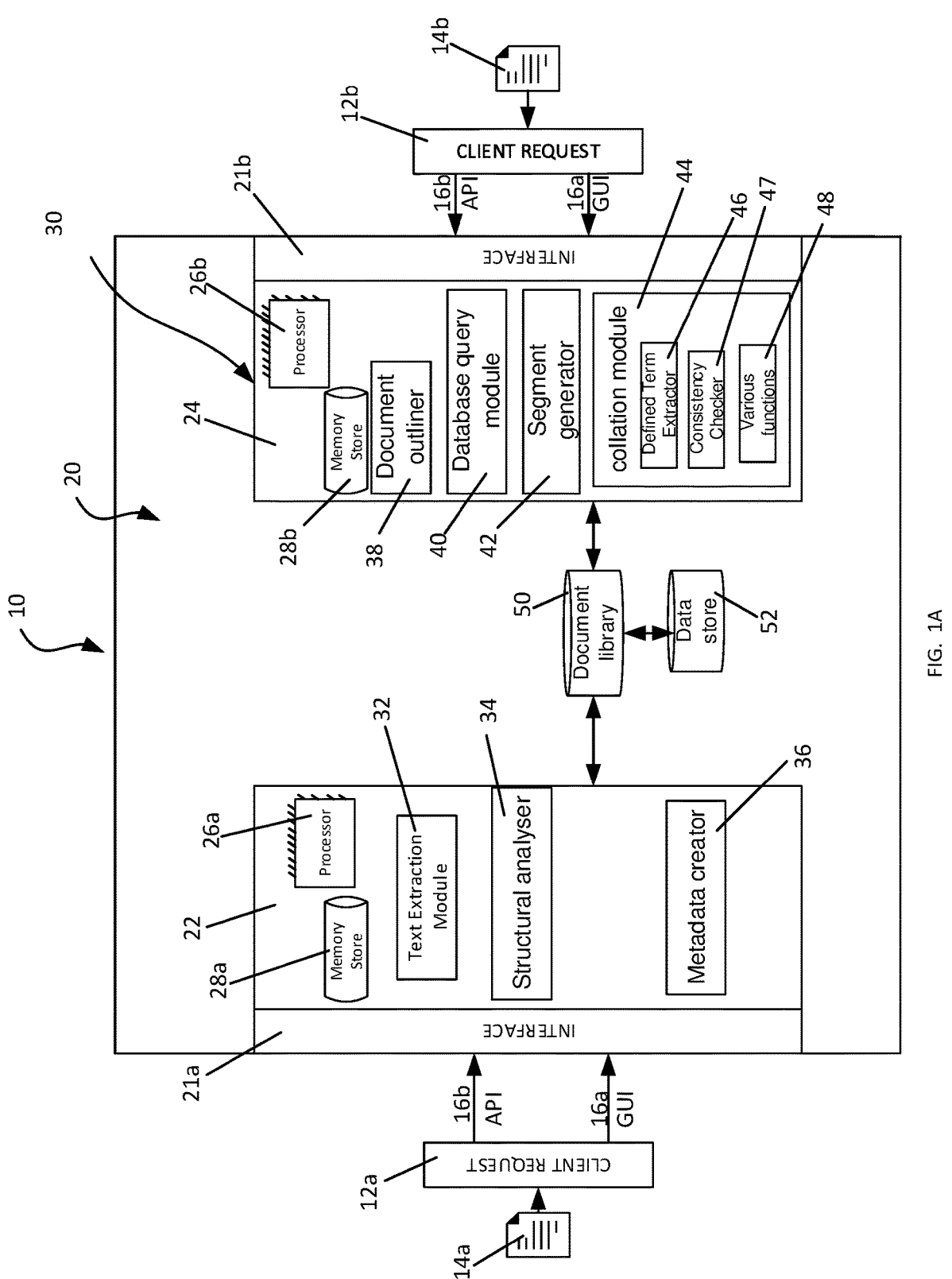
FIG. 1A depicts an exemplary schematic diagram high-lighting an arrangement of components for performing the steps of the method of metadata generation outlined in FIG. 1B and FIG. 1C and document creation outlined in FIGS. 2A, 2B according to an exemplary embodiment of the present disclosure.

Referring to the Figures, FIG. 1A depicts an exemplary schematic architecture 10 depicting various modules of an embodiment of the system of the present disclosure.

As depicted, a client request 12a in the form of one or more documents 14a for an analysis is received at a server 20 or collection of servers 22, 24 via an interface 21. This request may be received via user interaction with a graphical user interface 16a, or via an Application Programming Interface (API) call 16b or in other ways as is known in the art.

As is known in the art each server 22, 24 of the servers has one or more processors 26a, 26b, and one or more memory stores 28a, 28b for storing data and operating instructions etc. It would be appreciated that different arrangements of the hardware could be used without departing from the scope of the present disclosure. Each server 22, 24 includes a number of logical modules 30 which will be explained in more detail below. Each server is in communication with a document library 50 which includes metadata for documents and segments thereof; and potentially a data store 52 which may store the documents themselves. It would also be appreciated that the same data store may be configured to store the documents and the metadata without departing from the present disclosure.

It should also be noted for ease of reference that two servers have been depicted; the first server performing the document analysis and the second server performing the document creation; although these functions could have course be performed by various modules disposed on the same server without departing from the present disclosure.

The request for document analysis as depicted is handled by server 22 which includes a Text Extraction module 32 which is a function configured to handle various document formats and accurately extract the textual content while preserving the original structure and formatting to the extent possible.

This server 22 further includes a structural analyser module 34 which is advantageously a large language module configured to utilize advanced AI techniques, including pre-prompting and few-shot learning, to discern the structure within documents as will be described further herein.

The structural analyser model is configured to identify a plurality of segment titles in the extracted text and derive regular expressions therefrom; and then generate a segmented document comprising extracted text in logical segments with corresponding segment titles by analysing the generated regular expressions.

Server 22 further includes a metadata creator module 36 which is advantageously a large language module configured to analyze the text and generate structured metadata for each segment of the document. Advantageously this metadata, received in either JSON or XML format, is processed and incorporated into a Document Object as Document Level Metadata and is returned to the main process for further actions or storage in document library 50.

Similarly, a client request 12b for generation of one or more documents 14b is received at a server 20 or collection of servers 22, 24 via an interface 21b. This request may be received via user interaction with a graphical user interface 16a, or via an Application Programming Interface (API) call 16b or in other ways as is known in the art.

Server 24 includes a number of modules 30 as depicted.

The document outliner module 38 is a large language model configured to generate a structured outline for the requested document type requested. This outline is not merely a list of headings; it is a comprehensive framework that includes logical segments, each accompanied by pertinent metadata.

A two-phase process is used to convert the structured outline into a comprehensive document.

The first phase focuses on gathering context and examples from the document library, and the subsequent phase leverages another large language module—a segment generator module 42 to generate the textual content of each segment.

A database query module 40, advantageously a large language model, translates plain language queries into structured database queries to retrieve relevant samples from the document library 50.

The segment generator module 42, another large language model is configured to use the context and examples for generating the textual content for each segment. The module receives the logical title and associated metadata for each segment, along with the relevant results from the document library as pre-prompting examples. These inputs serve to guide the content generation process, ensuring that the text is both relevant and informed by existing knowledge retried from the document library 50.

The collation module 44 performs a number of processes and phases and may comprise a plurality of sub modules as will be described further herein. The clarity and coherence of the generated document which comprises multiple segments is enhanced by identifying and defining key terms used throughout the chapters.

Advantageously, the collation module 44 may include the following sub modules:

Defined Term Extractor 46 which is advantageously a large language model configured to identify and extract defined terms from the text of a generated segment;

Consistency Checker 47 which is advantageously a large language model configured to specifically designed to analyse a list of defined terms and ensure their consistency and accuracy;

Various functions 48 are configured to:

a) compare the raw defined terms with the clean defined terms to identify any changes or refinements noted during the consistency check, resulting in a data structure that maps each raw defined term to its clean, updated version;

b) replace each instance of a raw defined term with its corresponding clean defined term; and c) compile the clean generated segments into a single, cohesive document.

Figure 1B:
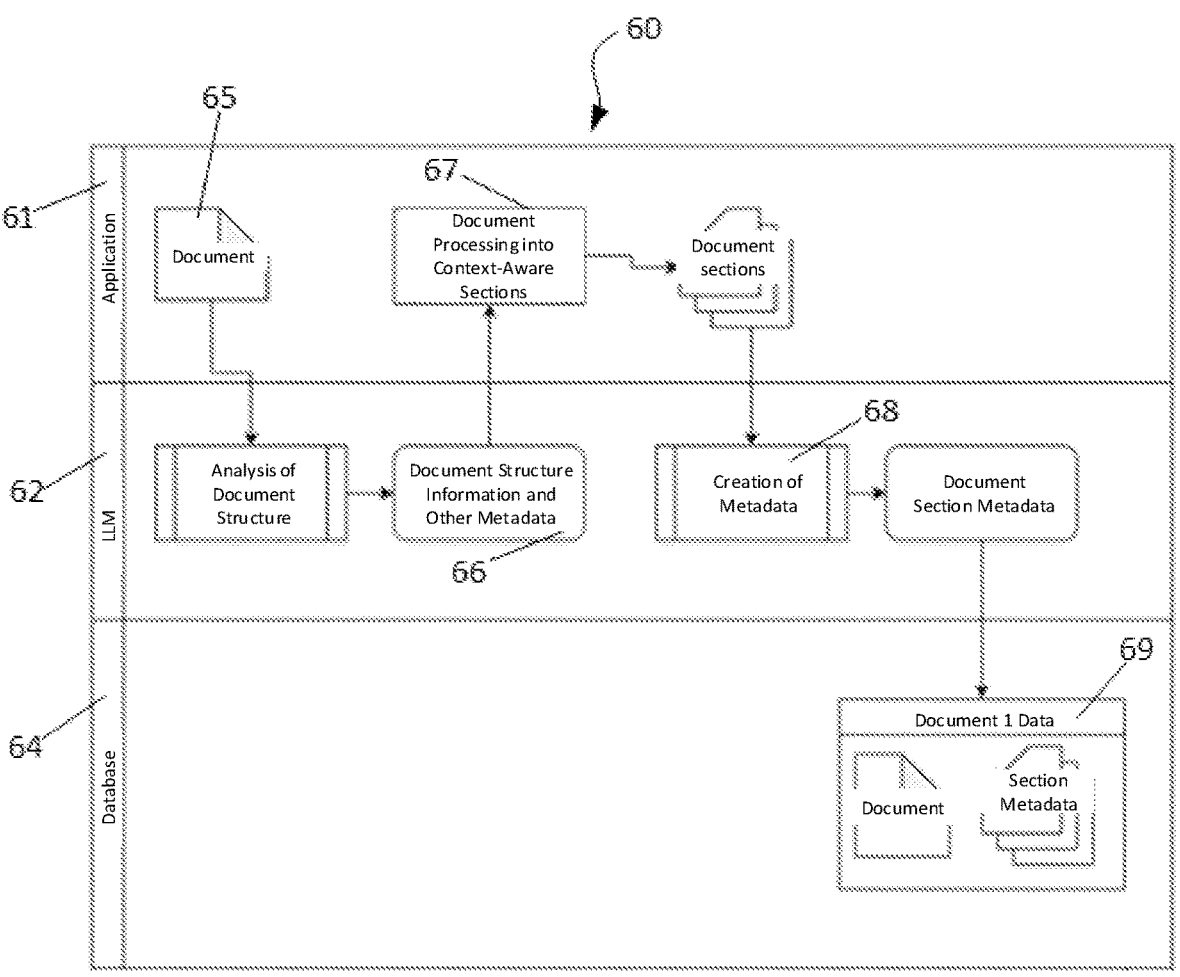
FIG. 1B depicts an exemplary flowchart showing the steps in the document workflow for analysing the metadata of one or more documents for the creation of a metadata enriched document library in an embodiment of the present disclosure.

FIG. 1B is an exemplary high-level overview 60 of various steps in the document workflow for analysing the metadata of one or more documents. The architecture has been abstracted into three main components—an application module 61, large language modules 62, and a database 64.

One or more documents 66 are provided to the application module 60 which uses large language modules 62, to generate surface level metadata about the document as a whole in step 66 (e.g., the general classification of the document, date, authors or parties, etc.). The large language modules 62 also generate information about how the document is logically organized (e.g., by chapters, sections, clauses, etc.).

The application module then uses information about how the document is organized to break the document into its individual segments in step 67. These segments are then provided to the large language modules 62, for further analysis and to create additional detailed metadata in step 68. The original document, collection of document sections, and associated metadata are then stored in the database in step 69.

Figure 1C:
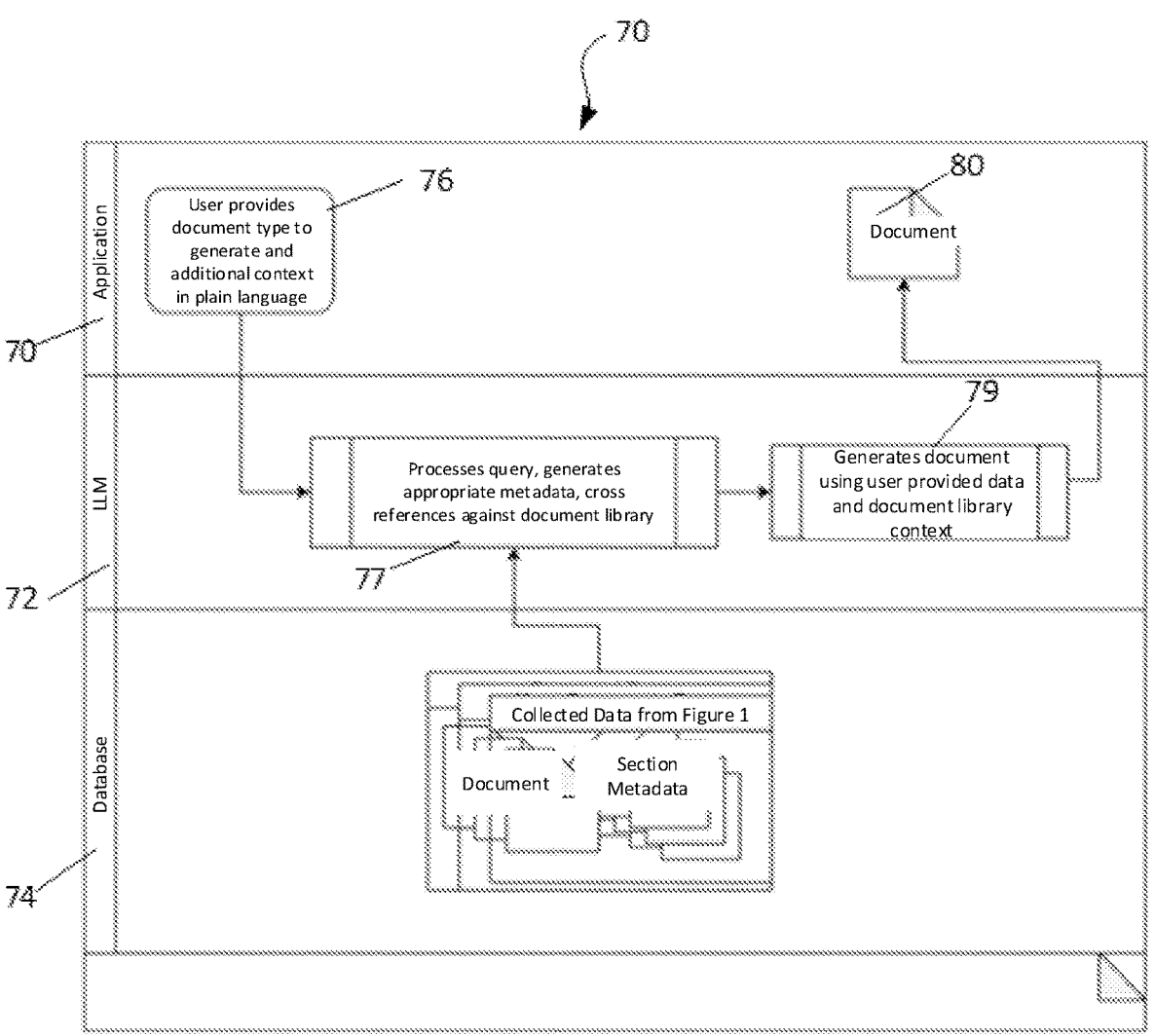
FIG. 1C depicts a flowchart showing the steps in the document workflow for generating one or more documents utilizing the metadata enriched document library in an embodiment of the present disclosure.

FIG. 1C is an exemplary high-level overview of various steps in the document workflow for generating one or more documents. The architecture described with reference to FIG. 1A has been abstracted into three main components, an application module 70, large language modules 72 and database library of processed documents 74.

Once a library of documents has been established, the user can provide several requirements to the application module 70 in step 76. These requirements are then passed to the large language modules 72 in step 77 which cross-references appropriate information in the document library to create a novel document based on the user's requirements.

This novel document is then packaged and then presented to the user through the application module in step 80.

Referring to the drawings, FIG. 2A depicts an outline 100 of the steps in a method according to an embodiment of the present disclosure.

As depicted, the process of generating metadata for a document is commenced once a request for analysis of one or more documents is received from a user, typically using an API for programmatic interaction or via a GUI actuated by a user in step 110. The request includes the document(s) to be processed, which can be in various formats such as PDF, DOCX, or TXT files.

Next in step 112, the text is extracted from the documents for analysis. Preferably, the extracted text may be extracted so as to be appropriately, sized for the underlying model (e.g. approximately 1,000 words); with larger documents potentially broken down into a plurality of text excerpts.

At step 114, the extracted text is passed to the structural analyser module which is configured to analyse the text to generate regular expressions for section titles. By analyzing extensive excerpts of text, the module can identify patterns that denote section breaks, chapter titles, or other significant textual divisions. Preferably, the structural analyser module is a tuned large language model configured to generate regular expressions from the extracted text and formatting to identify logical breaks (including e.g. section titles).

Advantageously, the use of low temperature settings in the structural analyser model parameters ensures that the generated expressions are consistent and less prone to variability, which is crucial for creating accurate regular expressions for section titles. Similarly, limiting the maximum token return helps in focusing the model's output to be concise and directly relevant to the task at hand. The generated regular expressions provide a means to programmatically identify and categorize different sections of a document based on their titles or formatting cues. Preferably the structural analyser may be tuned with few shot learning examples, and pre-prompting to assist.

Next at step 116, the generated regular expressions and the full extracted text of the document are analysed to identify and extract logical breaks, such as chapters or sections and form a segmented document. Preferably, this function is configured to handle various document layouts and formatting styles, and a corresponding multiplicity of regular expressions are generated for the sections therein by the Structural Analyser for that now segmented document.

The segmented document comprises a data structure (e.g., a list) comprising multiple elements which each contains the text of a separate logical chapter or section. Effectively the document text is divided into constituent logical segments, each representing a coherent unit of the document's structure. For example, a textbook would be divided into constituent chapters, and a contract would be divided into constituent components.

This structured representation of the document facilitates further analysis, manipulation, or processing, such as metadata extraction, summarization, or indexing.

Next at step 118, a tuned machine learning model (preferably a large language model) is configured to iterate through the segments (logical chapters) of the document and generated structured metadata for that segment. Advantageously, this metadata is produced by the model in readily machine-readable format (e.g., JSON or XML format) is processed and incorporated into a Document Object as Document Level Metadata.

Advantageously, the Metadata Creator is an advanced AI model trained to understand and extract key information from text segments, leveraging few-shot learning techniques. This agent is specifically designed to produce metadata in a machine-readable structured format (e.g., JSON or XML) that succinctly summarizes the content and key attributes of each chapter. Given a block of text from a chapter, the agent generates metadata that might include the chapter title, summary, keywords, and other relevant information. Preferably, the use of moderate temperature settings in the agent ensures a balance between creativity and relevance in the generated metadata, while a large token length parameter allows for comprehensive metadata generation, suitable for chapters of varying lengths. The generated metadata may be parsed according to the desired format as appropriate.

Finally at step 120, the original document, corresponding extracted text, overall metadata of the document, text of each logical section, and corresponding generated respective metadata are stored in one or more Document Libraries; advantageously in a database or data store. Optionally, given the structured and potentially large size of the data, a NoSQL database may be used due to its flexibility in handling varied data formats and scalability. In some embodiments, the original document may be stored separately from the extracted text, overall metadata of the document, text of each logical section, and corresponding generated respective metadata in a further document library in another data store.

It would be appreciated that database schema should be designed to accommodate the document text, overall metadata, and the metadata for each logical section. This structured storage allows for efficient retrieval, search, and analysis of the documents and their contents at a later stage. The document's original format (e.g., PDF, DOCX) can also be stored either directly in the database (if size permits) or as a reference to a file storage location.

If the last document in the collection of documents provided has been analysed (branch 121) then the process ends. If there are further documents to be analysed, the above steps may be repeated as indicated by branch 122.

Figure 2B:
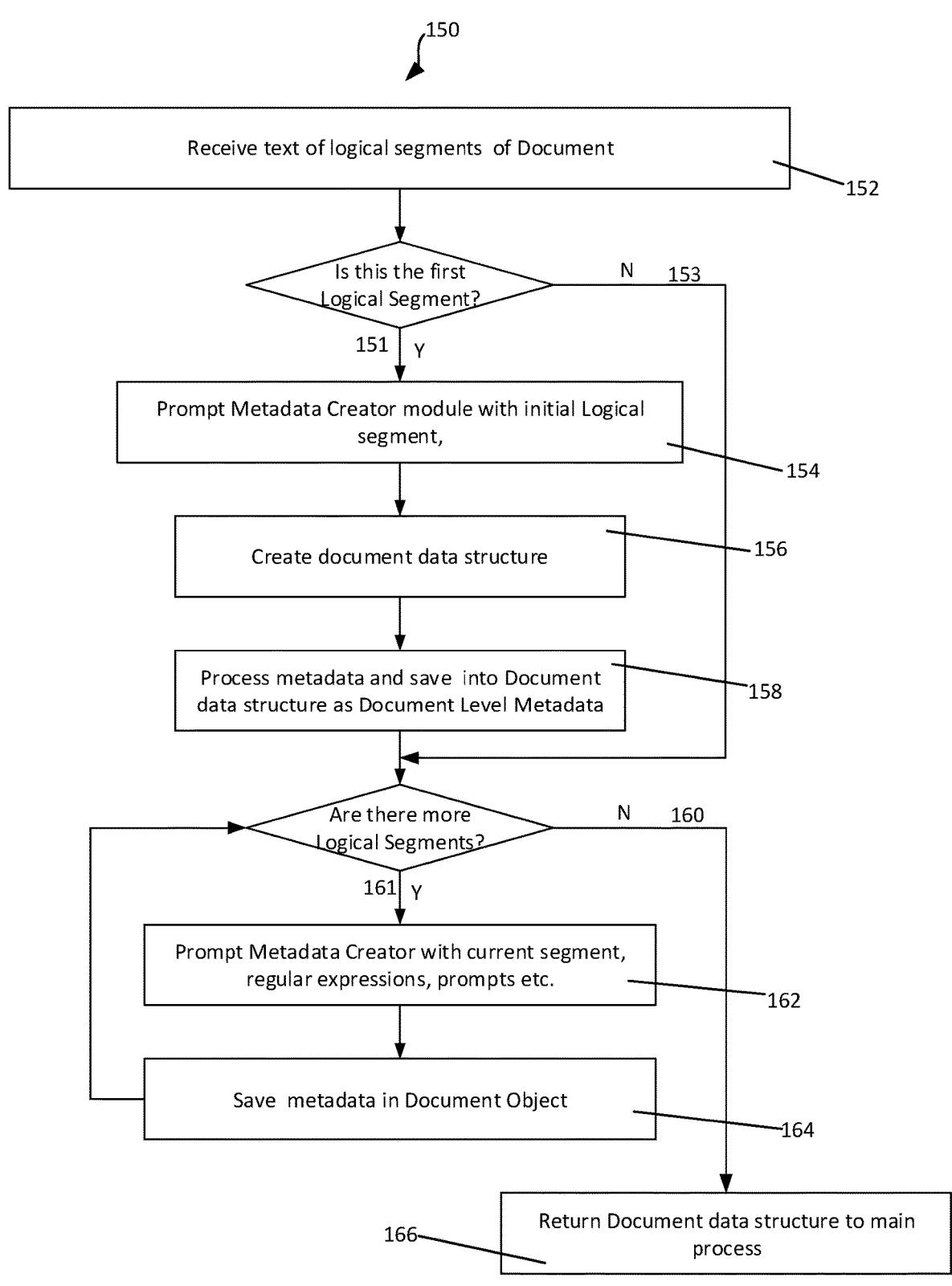
FIG. 2B depicts a more detailed flowchart outlining the steps in creation of the metadata for segments within a document, and the creation of metadata for the document itself in further detail to the steps of FIG. 2A.

FIG. 2B depicts a flowchart 150 outlining the steps in creation of the metadata for segments within a document, and for the document itself as described above in step 118 of FIG. 2A.

As depicted, at step 152 the text which has been divided into logical segments is received by the tuned model. If the text is the first logical segment as indicated by branch 151, the Metadata creator module is prompted with an indication that this is the first logical segment in step 154; as well as the generated regular expressions for that segment, and the extracted text as described above. Advantageously, metadata (e.g., JSON or XML) is generated for that logical segment. A document data structure is created e.g., a Document Object at step 156; and the generated metadata saved in step 158.

Alternatively, if it is not the first logical segment; the process follows branch 154.

As indicated, at step 160 an evaluation is conducted to determine if there are additional logical segments. If there are additional logical segments (as indicated by branch 161), at step 162, the metadata creator model is prompted with the current segment text, regular expressions and training material as described herein, and metadata is generated for that segment. The metadata for that segment is saved at step 164 in the Document object. The process control then returns to step 160 where evaluations are conducted until no more logical segments are contained in the document (branch 165). At step 166, the document data structure is returned to the main process.

Figure 3A:
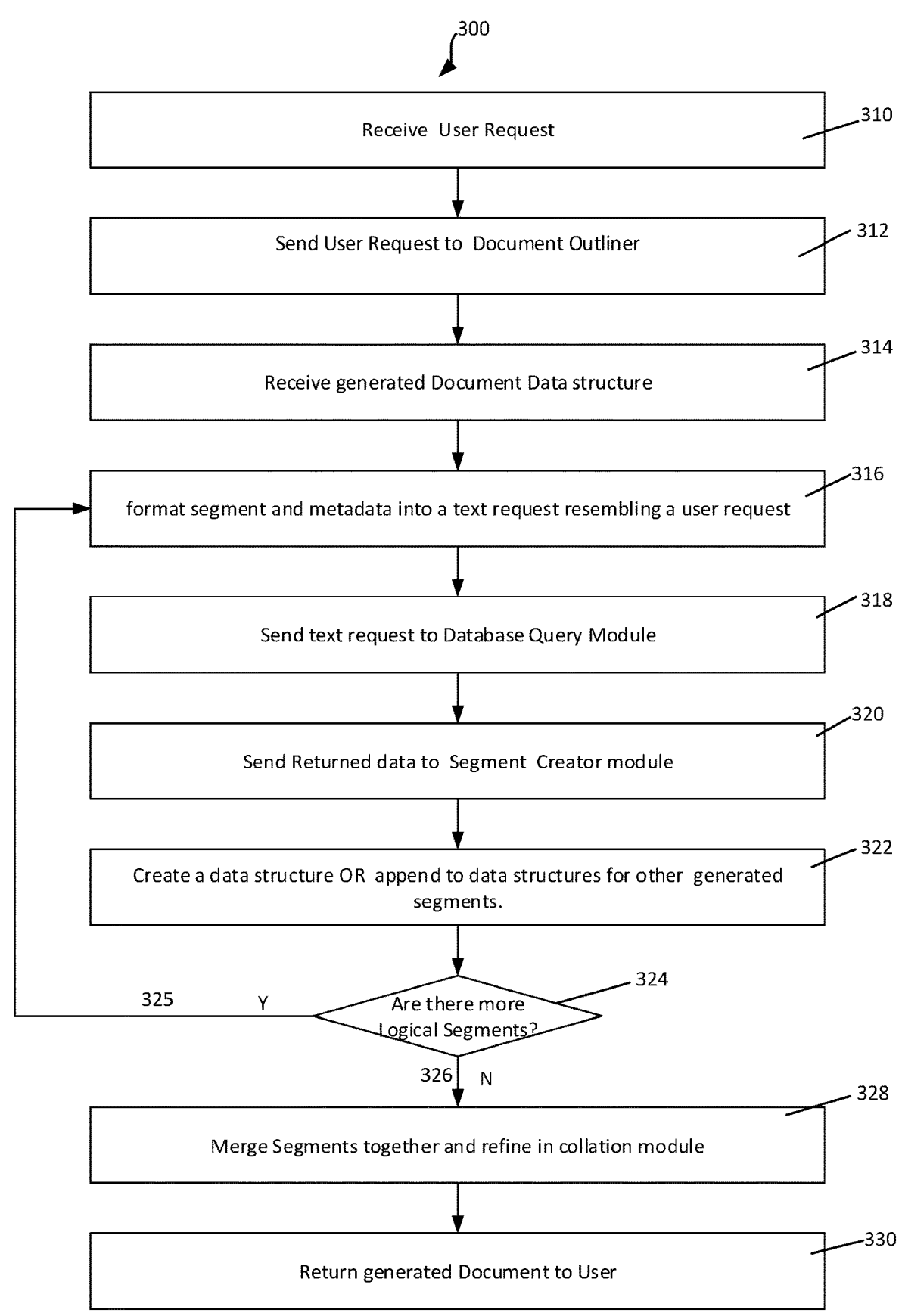
FIG. 3A depicts a flowchart outlining the steps in a process for generating a novel document in accordance with a further embodiment of the present disclosure.

Referring to FIG. 3A, there is depicted a flowchart 300 outlining the exemplary steps in a process for generating novel documents in accordance with a further embodiment of the present disclosure.

As depicted at step 310, a user request is received. Advantageously, this user request specifies the document type to be created and additional details in plain language. The user specifies the document type they wish to create, providing this information in plain language to ensure ease of use and accessibility. The request may also include additional details that further refine or specify the requirements for the document to be generated. This could range from the specific purpose of the document, any particular clauses that need to be included, to more nuanced details pertaining to the style or tone of the document.

The text of the user request is passed to the Document Outliner module at step 312. The operation of the Document Outliner module is described in more detail further herein. It should be noted that a structured outline for the requested document type is generated, which is not merely a list of headings; but a comprehensive framework that includes logical segments, each accompanied by pertinent metadata. This module is configured to operate with a high temperature setting and allows for a substantial number of maximum tokens. As is known in the art, this temperature setting controls the randomness of the output. These settings are critical as they enable the agent to generate more creative and varied outputs, ensuring that the document outlines are not only relevant but also uniquely tailored to the user's request.

The document outline is generated by the document outliner module and sent as a document data structure in step 314.

For each of the segments in the document data structure, text is generated which is derived from the segment metadata and then merged and refined using a collation module as is described herein.

Generation of the text for each of the segments is performed in step 316, wherein the segment and metadata are transformed by a function into a text request which is analogous to a user request; with this text request being then further processed to generate the textual content of each segment in two main phases.

In the first phase in step 318, for each segment specified in the Document data structure, a query is formulated to retrieve relevant samples from the document library (advantageously a no SQL library) as described further with reference to FIG. 3C. The output from a specialised Database Query Module is used to gather context and examples from a document library using the.

Figure 3D:
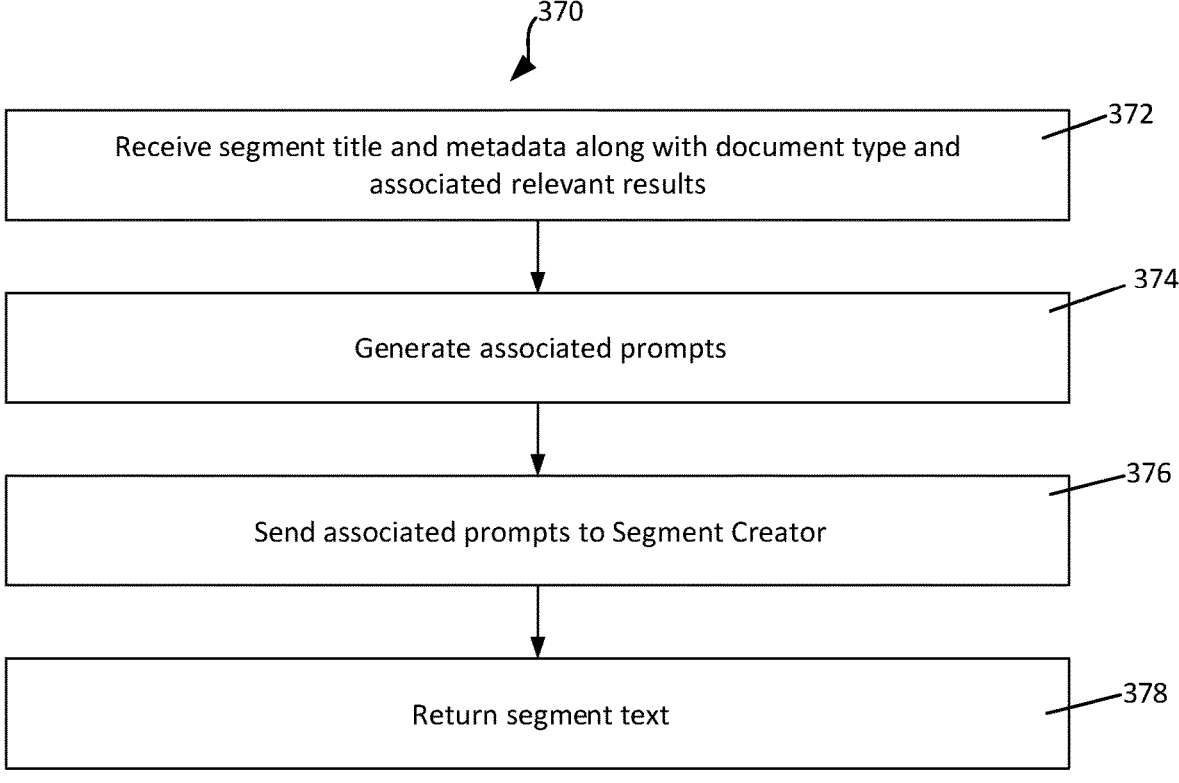
FIG. 3D depicts a flowchart outlining in more detail the steps in the operation of the Segment Creator module referred to in FIG. 3A.

The second phase set out in step 320 leverages another sophisticated model, the Segment Creator Module to generate the textual content of each segment as described further with reference to FIG. 3D.

As depicted at step 322, if this is the first generated segment, a data structure is created (e.g., a list) of segments (the "Collected Generated segments") with this as the first entry. Alternatively, if this is not the first segment, then the newly generated segment is appended at the end of the existing data structure.

An evaluation is made as to whether there are additional logical segments in the document at step 324; and if there are the process repeats (branch 325) or else proceeds to the next step (branch 326).

Once all the segments have been generated, they are merged and refined as indicated in step 328; and the final document returned to the user in step 330.

FIG. 3B depicts a flowchart 350 of exemplary steps performed by the Document Outliner module described above at step 312 in more detail.

First; document type and associated additional context is received from the user in step 351. This is then provided as a prompt to a document outliner module which provides a document outline of logical segments with metadata in step 352.

This is processed in a function called by the outliner module to generate a document outline with logical segments and associated metadata in step 354 in a document data structure, e.g. document object. This structure encapsulates the generated document outline, which includes the logical segments along with associated metadata for each. (These logical segments may also be thought of as chapters, divisions or sections as appropriate). The metadata can encompass a range of information, from thematic keywords to specific legal or technical requirements pertinent to each section, depending on the document type. This data structure is then returned to the user in step 356.

As depicted in FIG. 3C, there is shown in more detail a flowchart 360 depicting the steps in the operation of the Database Query module at step 318. As depicted, a request is received from the user in step 362, which is then sent as a prompt to the tuned model which is configured to generate from the prompt an appropriate database query e.g. (e.g., SELECT*FROM documents WHERE year="2021") in step 364.

The query is formulated using a Database Query module which translates plain language queries into structured database queries. This module is advantageously a large language model which has been fine-tuned using few-shot learning techniques to understand and convert natural language requests into precise queries for a specific database type, such as SQL or NoSQL. As described herein the process will discuss generating NoSQL queries, considering the document library is advantageously stored in a NoSQL database.

Given the unique capabilities of this module a low temperature setting is used to ensure the queries are generated with high precision and less variability. Preferably a moderate maximum token parameter is used to ensure the queries are concise and to the point.

This query is returned to the main process as depicted in step 366.

As depicted in FIG. 3D, there is shown in more detail a flowchart 370 depicting the steps in the Segment Creator module.

As depicted in step 372, the logical Segment title and metadata along with document type and associated relevant results are received from the main process. These are used by a function in step 374 to generate appropriate prompts which are then provided to the segment generation module. This segment generation module receives the logical title and associated metadata for each segment in step 376 along with the relevant results from the document library as pre-prompting examples. These inputs guide the content generation process of step 378, ensuring that the text is both relevant and informed by existing knowledge contained in the document library.

Figure 3E:
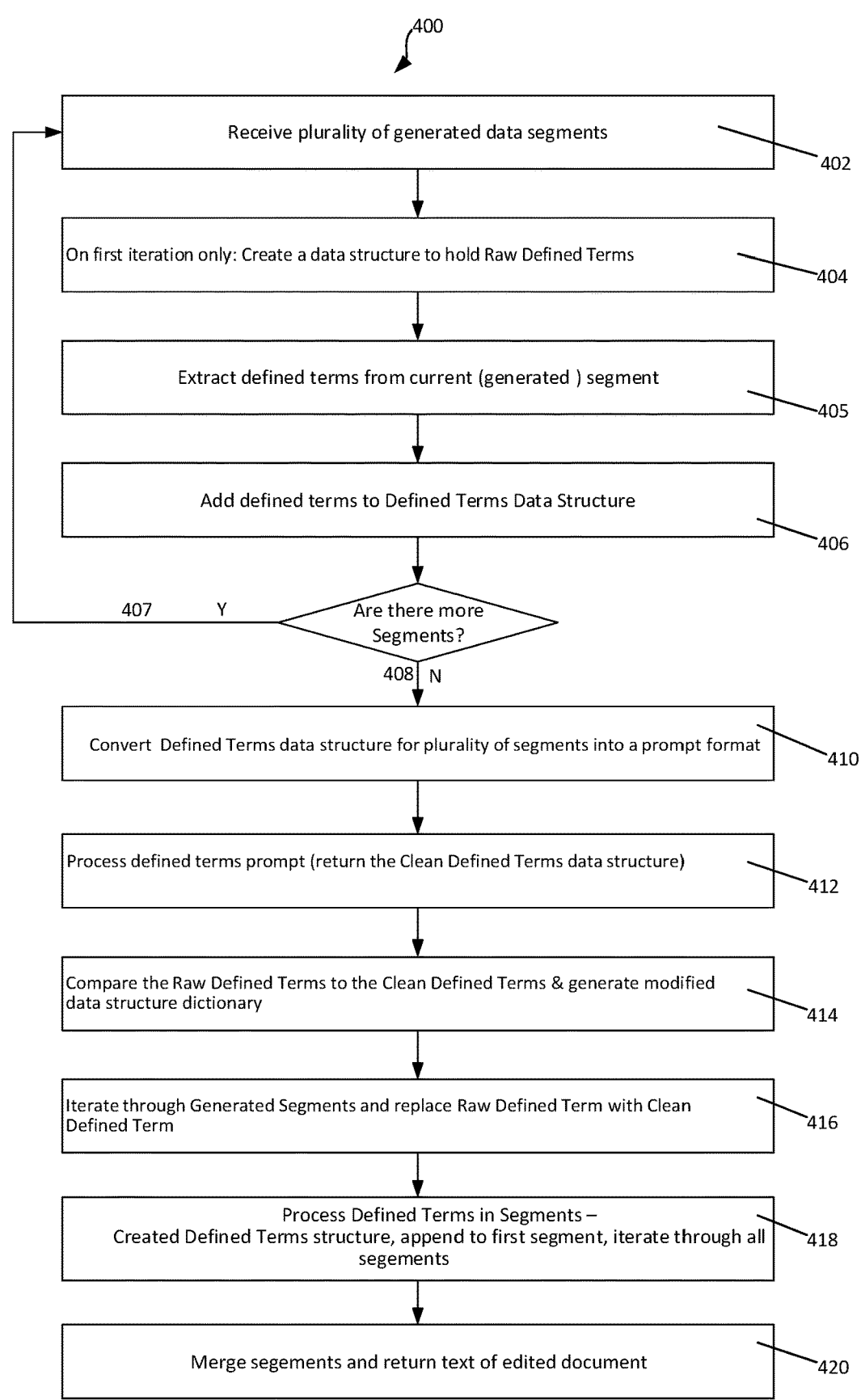
FIG. 3E depicts a flowchart outlining the steps performed by an exemplary collation module for merging and refining segments as outlined in FIG. 3A.

Next it is necessary to ensure that the segments are consistent and coherent, which involves the use of a tuned model, preferably a large language model which is called the Collation Module to merge and refine the individual segments which have been created. The processing undertaken by the collation module is depicted schematically with reference to FIG. 3E, and this proceeds in a number of phases as depicted in flowchart 400.

As depicted at Step 402, a plurality of generated segments is provided.

If the first segment is being analysed, an empty data structure is created in step 404. If the segment being analysed is not the first segment, this step is skipped. Next the defined terms are extracted in step 405 and added to the Defined Terms data Structure in step 406.

This first phase involves "Defined Term Extractor," a specialized Large Language Model (LLM) sub-module. This sub-module generates a new dictionary data structure on the first iteration or updates the already created data structure by creating an entry in that data structure, or updating an existing entry with additional definition based on the content of the term being analysed if this additional information adds more detail. Each entry comprises a defined term and a corresponding definition extracted from that segment and a content identifier.

This dictionary data structure facilitates easy reference for defined terms and also ensures consistency and clarity throughout the segments which make up the document.

Preferably, the sub module operates with a low temperature setting to prioritize accuracy and relevance in the extracted terms, while a high token length parameter allows for comprehensive definitions.

This is repeated for each segment in the plurality of segments as is indicated by branch 407, until there are no further segments to be processed as is indicated by branch 408.

Once all of the defined terms have extracted from the plurality of segments which have been passed to the collation module, it is necessary to evaluate these and introduce consistency.

Advantageously, the defined terms are inserted into a pre-defined prompting template to be further used for pre-prompt tuning in step 410.

This prompt is then passed in step 412 to the Defined Terms Consistency Checker sub module, together with temperature and max token settings. It operates with a moderate temperature setting to balance creativity and precision, and a high token length parameter to allow for comprehensive processing of each term and its definition.

This sub module, preferably a large language model is tuned with few-shot learning techniques, one of them being the defined terms prompt created in step 410 and is specifically designed to analyze a list of defined terms and ensure their consistency and accuracy. The output from this sub-module is a "Clean Defined Terms" data structure, where inconsistencies have been addressed, and definitions have been refined.

Once the defined terms have been made consistent, it is necessary to reintroduce these defined terms back into the segments of the document. This is performed in two main steps. In step 414, a mapping of the initially extracted "raw" defined terms and clean defined terms is performed. In step 416, using this mapping, the system iterates through the generated segments to replace the raw terms with their clean counterparts.

Advantageously each term in the raw defined terms is matched to a corresponding updated term and definition; and the original raw data structure entry has the corresponding replacement entry created. If there is an inconsistency between the definition associated with the initial entry, it can be replaced by the updated definition. Once this has been performed for each term in the data structure of raw terms, a modified data structure is created.

Each occurrence of the defined term in each of the segments is then replaced using the modified data structure in each of the segments, and the updated segment is then stored in step 418.

In step 420, the clean generated segments are combined into a single, cohesive document and returned. Optionally, legal or academic documents may require the creation of a dedicated "Defined Terms" section that consolidates all clean defined terms and their definitions. Advantageously, this segment is added to the beginning of the document to serve as a reference for readers. Following this, all segments are combined, including the newly added "Defined Terms" segment, into a single document text.

The process culminates in a well-structured, coherent document that presents the generated content in a logical sequence and also provides readers with a "Defined Terms" section for easy reference.

This approach enhances the readability and professionalism of the final document, ensuring that it meets the standards expected of a polished, comprehensive text. The integration of clean defined terms throughout the document ensures consistency and clarity.

The above embodiments are described by way of example only. Many variations are possible without departing from the scope of the disclosure as defined in the appended claims.

In an exemplary application of the present system, assume a financial analyst uses the invention to create a library of financial reports related to various companies. The analyst uploads a collection of financial reports, such as balance sheets, income statements, and cash flow statements, through the user interface. The system processes each document using the method described herein, which extracts relevant information and generates comprehensive metadata for each report. The application module associates this metadata with the respective documents, and the structural analyzer module suggests context-aware divisions, such as sections or subsections, for a more organized and accessible presentation of the financial data.

Once the financial reports and their associated metadata are stored in the document library, the financial analyst can efficiently search and retrieve specific information based on their needs.

Further, the analyst may additionally utilize the system to generate a new document, such as a research report comparing the financial history of two different companies.

Through the user interface, the analyst specifies the desired criteria, such as the names of the two companies, financial metrics of interest, and the time period for comparison. The system then accesses the relevant financial reports and metadata stored in the document library, retrieving the necessary information to conduct the comparative analysis.

The system processes the extracted data, synthesizing the financial metrics and historical trends for each company, and generates a comprehensive research report that highlights the differences and similarities in their financial performance. The report includes key financial data, comparative charts, and insightful observations, all tailored to the analyst's requirements. By leveraging the invention's document generation capability, the financial analyst can efficiently produce customized research reports that facilitate informed decision-making and enhance the overall quality of their analysis.

The systems capability to generate metadata-rich document libraries and novel documents significantly enhances the productivity and effectiveness of financial analysts. By automating the document analysis and organization process, the system reduces the time and effort required for data extraction and reports. As a result, financial analysts can focus on higher-level tasks, such as interpreting the data and formulating investment strategies, ultimately leading to improved decision-making and performance in the financial sector.

In another exemplary application, an in-house lawyer at a small business faces the challenge of organizing a large number of legal contracts, such as vendor agreements, employment contracts, and non-disclosure agreements. To streamline the process and improve efficiency, the lawyer utilizes the system of the present disclosure to create a library of legal contracts and their associated clauses. Through the user interface, the lawyer uploads the contracts and specifies the desired metadata fields, such as contract type, parties involved, effective date, and key legal clauses. The system processes each contract using the modules described herein, extracting pertinent information and generating comprehensive metadata. The application module associates the metadata with the respective contracts, while the LLM module suggests context-aware divisions, such as sections or chapters or individual clauses, for better organization and accessibility of the underlying legal information.

With the legal contracts and their associated metadata stored in the document library, the in-house lawyer can efficiently search and retrieve specific contracts or clauses based on their requirements.

The lawyer may employ the system of the present disclosure to generate a new contract with clauses similar to those found in other contracts within the document library. The lawyer first specifies the desired criteria through the user interface, such as the type of contract needed (e.g., vendor agreement, employment contract, or non-disclosure agreement), parties involved, and any specific clauses or provisions that should be included or adapted.

The system accesses the relevant contracts and associated metadata stored in the document library, retrieving the necessary information to fulfil the lawyer's requirements. The system processes the extracted clauses and provisions from the existing contracts, identifies patterns and similarities, and adapts the content as needed to create a new contract tailored to the specific situation.

The newly generated contract incorporates clauses that are consistent with the legal language associated with similar contracts found in the document library, ensuring that the new contract is in line with established standards and practices. By leveraging the invention's document generation capability, the in-house lawyer can efficiently create new contracts with customized clauses based on the existing legal documents in the library, ultimately saving time and effort while maintaining the quality and consistency of their legal work.

The powerful document analysis module described herein analyses the structure and content of each document to determine appropriate divisions, such as sections, chapters, or clauses, that will facilitate a more organized and accessible presentation of information. The document analysis module includes a metadata enriched document library which is created and supplemented by each analysed document and enhances the overall versatility and applicability of the invention, ultimately providing users with a comprehensive solution for managing and utilizing complex documents across various specialized fields. The document generation capability of the invention represents a valuable extension of the system's core functionalities with documents generated based on the content and metadata present in the document library. This feature leverages the text generation abilities of the LLM to synthesize information, create summaries, compare documents, or produce new custom documents, all tailored to the user's specific needs or preferences.

The system and method of the present disclosure in metadata generation and document analysis capabilities drive enhanced efficiency in document-intensive workflows. With the metadata enriched document library, users can easily search, retrieve, and analyze specific sections or clauses across a multitude of documents, improving the efficiency of financial analysis, contract analysis, or academic research. The organized presentation of information through appropriate divisions further streamlines document navigation and comprehension, enabling users to access relevant information quickly and make well-informed decisions within their specialized fields. By automating these processes and offering a comprehensive solution, the system and method of the present disclosure boosts productivity and reduces the time and effort traditionally required for document management.

The document generation capability of the system and method of the present disclosure ensures accuracy and consistency when creating new documents. By leveraging the content and metadata present in the document library, along with the powerful collation module to create professional, coherent, new documents across a variety of domains. This feature not only saves significant time and effort that would otherwise be spent manually drafting documents, but also minimizes the risk of errors or inconsistencies in the generated content. With the system and method of the present disclosure precise and reliable document generation, professionals in legal, research, or any specialized field can rely on consistent, high-quality output, expediting various document-related tasks and enhancing overall productivity.

For clarity of explanation, in some instances the present technology may be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method for generating a document having a given document type, the method comprising:

receiving, by one or more processors of a computing system and via a communication interface, a document request specifying the document type;

generating, by the one or more processors, text content for a plurality of segments based on the document type, wherein each segment is generated by the one or more processors through automated retrieval and processing of segment metadata retrieved from a document library of previously analyzed documents stored in a database;

extracting, by a large language model executed by the one or more processors, defined terms from the generated text content, the large language model being configured to identify terms and definitions of the terms across the plurality of segments;

modifying, by a consistency checker module executed by the one or more processors, the defined terms to create consistent versions through comparison of the definitions across the plurality of segments and generation of definitions performed by the consistency checker module based on stored digital data structures in memory of the computing system, wherein the consistency checker module compares different definitions of a same defined term extracted from different segments of the plurality of segments to identify inconsistencies therein and generates each consistent version by combining the different definitions of the same defined term into a single refined definition, wherein the modifying comprises generating a clean defined terms data structure comprising, for one or more of the defined terms, a corresponding consistent version and an associated refined definition;

replacing, by the one or more processors, the defined terms in the text content with the consistent versions within a digital document data structure stored in the memory of the computing system to generate the document, wherein the replacing comprises replacing the definitions associated with one or more the defined terms with the associated refined definition from the clean defined terms data structure when inconsistencies exist between an initial definition and the associated refined definition; and outputting, by the one or more processors, the document to a user interface or client device via the communication interface.

2. The method of claim 1, wherein generating text content for the plurality of segments comprises:

retrieving, via a database query, the segment metadata from the document library based on similarity between the requested segment and previously analyzed segments; and generating the text content based on the retrieved segment metadata.

3. The method of claim 1, further comprising:

generating, by a document outlining module executed by the one or more processors, a document outline data structure specifying the plurality of segments before generating the text content for the plurality of segments.

4. The method of claim 1, wherein the consistency checker module is configured to:

analyze the defined terms from the plurality of segments;

identify inconsistencies between definitions of the defined terms across the plurality of segments; and generate the consistent versions by addressing the inconsistencies.

5. The method of claim 1, further comprising:

generating a dedicated defined terms segment comprising the consistent versions and associated definitions; and inserting the dedicated defined terms segment into the document.

6. The method of claim 1, wherein the document library comprises a plurality of previously analyzed documents and, for one or more of the plurality of previously analyzed documents, structured metadata comprising the segment metadata and document metadata.

7. The method of claim 1, wherein extracting the defined terms comprises:

generating a dictionary data structure comprising entries, wherein each entry comprises a defined term, a corresponding definition, and a content identifier associating the defined term to a source segment; and for the defined terms in multiple segments, updating an existing entry in the dictionary data structure by adding additional definition information from a subsequent segment when the additional definition information adds detail not present in the existing entry.

8. The method of claim 1, wherein modifying the defined terms comprises:

inserting the defined terms into a pre-defined prompting template to generate a defined terms prompt;

providing the defined terms prompt as a few-shot learning example to the consistency checker module; and generating the consistent versions by the consistency checker module with the defined terms prompt as pre-prompt tuning.

9. The method of claim 1, wherein replacing the defined terms comprises:

generating a mapping data structure that maps each extracted defined term to a corresponding consistent version and an updated definition;

comparing one or more defined terms with a corresponding consistent version to identify changes made during consistency checking;

replacing definitions associated with the one or more defined terms when inconsistencies exist between an initial definition and the updated definition; and iterating through each segment to replace one or more occurrences of the one or more defined terms with the corresponding consistent version in the mapping data structure.

10. The method of claim 1, wherein:

the segment metadata are generated by a metadata creator module that analyzes text of previously analyzed documents divided into logical segments, and the segment metadata is stored in a first data library associated with a corresponding previously analyzed document stored in a separate document library.

11. The method of claim 1, further comprising:

iterating through the plurality of segments in sequence, wherein extracting defined terms comprises, for a first segment, creating an empty defined terms data structure, and for each subsequent segment, extracting defined terms from the subsequent segment and adding the extracted defined terms to the defined terms data structure, and wherein modifying the defined terms is performed after the defined terms have been extracted from the plurality of segments.

12. A non-transitory machine-readable medium for generating a document having a given document type, the non-transitory machine-readable medium storing instructions which, when executed by one or more processors of a computing system, cause the one or more processors to perform operations comprising:

receiving, by the one or more processors and via a communication interface, a document request specifying the document type;

generating, by the one or more processors, text content for a plurality of segments based on the document type, wherein each segment is generated by the one or more processors through automated retrieval and processing of segment metadata retrieved from a document library of previously analyzed documents stored in a database;

extracting, by a large language model executed by the one or more processors, defined terms from the generated text content, the large language model being configured to identify terms and definitions of the terms across the plurality of segments;

modifying, by a consistency checker module executed by the one or more processors, the defined terms to create consistent versions through comparison of the definitions across the plurality of segments and generation of definitions performed by the consistency checker module based on stored digital data structures in memory of the computing system, wherein the consistency checker module compares different definitions of a same defined term extracted from different segments of the plurality of segments to identify inconsistencies therein and generates each consistent version by combining the different definitions of the same defined term into a single refined definition, wherein the modifying comprises generating a clean defined terms data structure comprising, for one or more of the defined terms, a corresponding consistent version and an associated refined definition;

replacing, by the one or more processors, the defined terms in the text content with the consistent versions within a digital document data structure stored in the memory of the computing system to generate the document, wherein the replacing comprises replacing the definitions associated with one or more the defined terms with the associated refined definition from the clean defined terms data structure when inconsistencies exist between an initial definition and the associated refined definition; and outputting, by the one or more processors, the document to a user interface or client device via the communication interface.

13. The non-transitory machine-readable medium of claim 12, wherein extracting the defined terms comprises:

generating a dictionary data structure comprising entries, wherein each entry comprises a defined term, a corresponding definition, and a content identifier associating the defined term to a source segment; and for the defined terms in multiple segments, updating an existing entry in the dictionary data structure by adding additional definition information from a subsequent segment when the additional definition information adds detail not present in the existing entry.

14. The non-transitory machine-readable medium of claim 12, wherein modifying the defined terms comprises:

inserting the defined terms into a pre-defined prompting template to generate a defined terms prompt;

providing the defined terms prompt as a few-shot learning example to the consistency checker module; and generating the consistent versions by the consistency checker module with the defined terms prompt as pre-prompt tuning.

15. The non-transitory machine-readable medium of claim 12, wherein replacing the defined terms comprises:

generating a mapping data structure that maps each extracted defined term to a corresponding consistent version and an updated definition;

comparing one or more defined terms with a corresponding consistent version to identify changes made during consistency checking;

replacing definitions associated with the one or more defined terms when inconsistencies exist between an initial definition and the updated definition; and iterating through each segment to replace one or more occurrences of the one or more defined terms with the corresponding consistent version in the mapping data structure.

16. The non-transitory machine-readable medium of claim 12, wherein:

the segment metadata are generated by a metadata creator module that analyzes text of previously analyzed documents divided into logical segments, and the segment metadata is stored in a first data library associated with a corresponding previously analyzed document stored in a separate document library.

17. The non-transitory machine-readable medium of claim 12, the operations further comprising:

iterating through the plurality of segments in sequence, wherein extracting defined terms comprises, for a first segment, creating an empty defined terms data structure, and for each subsequent segment, extracting defined terms from the subsequent segment and adding the extracted defined terms to the defined terms data structure, and wherein modifying the defined terms is performed after the defined terms have been extracted from the plurality of segments.

18. A system for generating a document having a given document type, the system comprising:

one or more processors; and memory storing instructions which, when executed by one or more processors, cause the one or more processors to perform operations comprising:

receiving, by the one or more processors and via a communication interface, a document request specifying the document type;

generating, by the one or more processors, text content for a plurality of segments based on the document type, wherein each segment is generated by the one or more processors through automated retrieval and processing of segment metadata retrieved from a document library of previously analyzed documents stored in a database;

extracting, by a large language model executed by the one or more processors, defined terms from the generated text content, the large language model being configured to identify terms and definitions of the terms across the plurality of segments;

modifying, by a consistency checker module executed by the one or more processors, the defined terms to create consistent versions through comparison of the definitions across the plurality of segments and generation of definitions performed by the consistency checker module based on stored digital data structures in the memory, wherein the consistency checker module compares different definitions of a same defined term extracted from different segments of the plurality of segments to identify inconsistencies therein and generates each consistent version by combining the different definitions of the same defined term into a single refined definition, wherein the modifying comprises generating a clean defined terms data structure comprising, for one or more of the defined terms, a corresponding consistent version and an associated refined definition;

replacing, by the one or more processors, the defined terms in the text content with the consistent versions within a digital document data structure stored in the memory to generate the document, wherein the replacing comprises replacing the definitions associated with one or more the defined terms with the associated refined definition from the clean defined terms data structure when inconsistencies exist between an initial definition and the associated refined definition; and outputting, by the one or more processors, the document to a user interface or client device via the communication interface.

19. The system of claim 18, wherein generating text content for the plurality of segments comprises:

retrieving, by a database query, the segment metadata from the document library based on similarity between the requested segment and previously analyzed segments; and generating the text content based on the retrieved segment metadata.

20. The system of claim 18, the operations further comprising:

generating, by a document outlining module executed by the one or more processors, a document outline data structure specifying the plurality of segments before generating the text content for the plurality of segments.

* * * * *